US011232795B2

(12) United States Patent
Aggarwal et al.

(10) Patent No.: US 11,232,795 B2
(45) Date of Patent: Jan. 25, 2022

(54) SYSTEMS, METHODS, AND APPARATUSES FOR RESUMING DIALOG SESSIONS VIA AUTOMATED ASSISTANT

(71) Applicant: Google LLC, Mountain View, CA (US)

(72) Inventors: Vikram Aggarwal, Palo Alto, CA (US); Jung Eun Kim, San Francisco, CA (US); Deniz Binay, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/359,179

(22) Filed: Mar. 20, 2019

(65) Prior Publication Data

US 2019/0221212 A1 Jul. 18, 2019

Related U.S. Application Data

(63) Continuation of application No. 15/597,088, filed on May 16, 2017, now Pat. No. 10,269,351.

(51) Int. Cl.
*G10L 15/22* (2006.01)
*G06F 40/35* (2020.01)
(Continued)

(52) U.S. Cl.
CPC ........ *G10L 15/222* (2013.01); *G06F 3/04842* (2013.01); *G06F 9/485* (2013.01);
(Continued)

(58) Field of Classification Search
None
See application file for complete search history.

(56) References Cited

U.S. PATENT DOCUMENTS 6,163,794 A ‡ 12/2000 Lange ................. H04L 63/10
709/202
7,454,351 B2 ‡ 11/2008 Jeschke ............... B60R 16/0373
704/275
(Continued)

FOREIGN PATENT DOCUMENTS

WO 2016025277 2/2016
WO WO-2016025277 ‡ 2/2016
(Continued)

OTHER PUBLICATIONS

European Patent Office; International Search Report and Written Opinion of PCT Ser. No. PCT/US2018/032784; 17 pages; dated Aug. 31, 2018.‡

(Continued)

*Primary Examiner* — Richard Z Zhu
(74) *Attorney, Agent, or Firm* — Middleton Reutlinger

(57) ABSTRACT

Methods, apparatus, systems, and computer-readable media are provided for storing incomplete dialog sessions between a user and an automated assistant in order that the dialog sessions can be completed in furtherance of certain actions. While interacting with an automated assistant, a user can become distracted and not complete the interaction to the point of the automated assistant performing some action. In response, the automated assistant can store the interaction as a dialog session. Subsequently, the user may express interest, directly or indirectly, in completing the dialog session, and the automated assistant can provide the user with a selectable element that, when selected, causes the dialog session to be reopened. The user can then continue the dialog session with the automated assistant in order that the originally intended action can be performed by the automated assistant.

11 Claims, 8 Drawing Sheets

(51) Int. Cl.
  *G06F 9/48*      (2006.01)
  *G06F 3/0484*    (2013.01)
  *G10L 25/51*     (2013.01)
  *G06F 16/332*    (2019.01)
  *G06F 16/9032*   (2019.01)
  *G06F 9/46*      (2006.01)

(52) U.S. Cl.
  CPC .............. *G10L 25/51* (2013.01); *G06F 9/461* (2013.01); *G06F 9/4856* (2013.01); *G06F 16/3325* (2019.01); *G06F 16/90332* (2019.01); *G06F 40/35* (2020.01); *G10L 2015/223* (2013.01); *G10L 2015/225* (2013.01); *G10L 2015/228* (2013.01)

(56) References Cited

U.S. PATENT DOCUMENTS

| | | | | |
|---|---|---|---|---|
| 7,984,440 | B2 ‡ | 7/2011 | James | G10L 15/22 701/36 |
| 8,214,219 | B2 * | 7/2012 | Prieto | B60N 2/002 704/275 |
| 8,631,419 | B2 ‡ | 1/2014 | Horvitz | G06F 9/485 719/318 |
| 8,823,507 | B1 | 9/2014 | Touloumtzis | |
| 9,378,467 | B1 | 6/2016 | Chaiyochlarb et al. | |
| 9,696,886 | B2 ‡ | 7/2017 | Krishnappa | G06F 3/04842 |
| 9,911,415 | B2 ‡ | 3/2018 | VanBlon | G10L 15/222 |
| 10,229,259 | B2 * | 3/2019 | Wang | G06F 21/32 |
| 2006/0095267 | A1 ‡ | 5/2006 | Yano | G10L 15/22 704/275 |
| 2006/0095268 | A1 ‡ | 5/2006 | Yano | G10L 15/22 704/275 |
| 2008/0127201 | A1 ‡ | 5/2008 | Mori | G06F 9/461 718/108 |
| 2009/0125813 | A1 ‡ | 5/2009 | Shen | G10L 15/22 715/728 |
| 2010/0257526 | A1 ‡ | 10/2010 | Zimmet | G06F 9/485 718/10 |
| 2011/0289503 | A1 ‡ | 11/2011 | Toub | G06F 9/4843 718/102 |
| 2014/0142953 | A1 | 5/2014 | Kim et al. | |
| 2014/0218372 | A1 * | 8/2014 | Missig | G06F 3/167 345/473 |
| 2014/0310001 | A1 * | 10/2014 | Kalns | G10L 15/32 704/270.1 |
| 2015/0039292 | A1 ‡ | 2/2015 | Suleman | G06F 17/289 704/9 |
| 2015/0142704 | A1 ‡ | 5/2015 | London | G06F 16/90332 706/11 |
| 2016/0042735 | A1 * | 2/2016 | Vibbert | G10L 15/222 704/257 |
| 2016/0259656 | A1 | 9/2016 | Sumner et al. | |
| 2016/0308980 | A1 * | 10/2016 | Singh | H04L 67/02 |
| 2017/0053110 | A1 * | 2/2017 | Wang | H04L 63/10 |
| 2018/0284958 | A1 * | 10/2018 | Alphin, III | G06F 16/24575 |

FOREIGN PATENT DOCUMENTS

| | | | |
|---|---|---|---|
| WO | 2016110954 | | 7/2016 |
| WO | WO-2016110954 | ‡ | 7/2016 |

OTHER PUBLICATIONS

European Patent Office; Examination Report issued for U.S. Appl. No. 18/732,517 dated Feb. 19, 2020 (8 Pages).

Korea Patent Office; Office Action issue in Application No. 10-2019-7037013; 13 pages; dated Jan. 27, 2021.

Japanese Patent Office; Notice of Reasons for Rejection issue in Application No. 2019-563499; 9 pages; dated Feb. 1, 2021.

Japanese Patent Office; Final Rejection issue in Application No. 2019-563499; 11 pages; dated Jul. 12, 2021.

European Patent Office; Summons to attend oral proceedings pursuant to Rule 115(1) EPC issued in U.S. Appl. No. 18/732,517.0; 11 pages; dated Sep. 8, 2021.

\* cited by examiner
‡ imported from a related application

SYSTEMS, METHODS, AND APPARATUSES FOR RESUMING DIALOG SESSIONS VIA AUTOMATED ASSISTANT

BACKGROUND

Automated assistants (also known as "personal assistant modules", "mobile assistants", or "chat bots") may be interacted with by a user via a variety of computing devices, such as smart phones, tablet computers, wearable devices, automobile systems, standalone personal assistant devices, and so forth. The automated assistants receive input from the user (e.g., typed and/or spoken natural language input) and respond with responsive content (e.g., visual and/or audible natural language output). Unfortunately, while interacting with an automated assistant, a user may become distracted and not complete the interaction to the point of a task or action being completed by the automated assistant. As a result, the user may subsequently have to repeat inputs to the automated assistant in order to have the automated assistant complete the task or action. This can be a waste of computational resources and/or human time, given that the automated assistant would be reprocessing commands from the user that were already processed during the previous interaction.

SUMMARY

The described implementations relate to systems, methods, and apparatuses for tracking incomplete interactions with an automated assistant so that they can be subsequently completed without having to repeat previous commands. Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input.

Automated assistants can be used for tracking incomplete interactions with the automated assistant so that they can be subsequently completed without having to repeat previous commands. Furthermore, tracking incomplete interactions provides the user the option of completing an interaction by their own election should the user be interrupted during an interaction or simply choose not to continue at some point during the interaction. For example, an automated assistant can be used by a user to place a phone call with a contact through spoken commands (e.g., "Assistant, please call Sally") to an automated assistant interface of a client device. The automated assistant can respond via the automated assistant interface with options of who exactly the user is referring to (e.g., "Would you like to call Sally Smith, Sally Beth, or Sally O'malley?"). The user may then become distracted and not respond to the automated assistant, thereby rendering the conversation between the user and the automated assistant incomplete because the automated assistant did not perform an action and/or complete a task (e.g., calling Sally) as a result of the conversation. The conversation between the automated assistant and the user can be stored in memory, which can be accessed by the automated assistant at a later time when the user is determined to be interested in having the automated assistant perform the action. For example, subsequent to the initial incomplete conversation, the user can be participating in an email thread that mentions someone named Sally. The automated assistant can acknowledge the mention of Sally in the email thread and provide a selectable element at an interface of the client device. The selectable element can include the phrase "Call Sally," and in response to the user selecting the selectable element, the automated assistant can provide an output corresponding to where the previous conversation ended (e.g., "Would you like to call Sally Smith, Sally Beth, or Sally O'malley?"). In this way, the user does not have to repeat past commands to the automated assistant, thereby streamlining the path to completing the intended action (e.g., placing a phone call to Sally).

Certain conversations can be stored by the automated assistant according to whether the conversations were complete or incomplete. Conversations between the user and the automated assistant can include multiple different spoken or typed commands from the user and multiple different responsive outputs from the automated assistant. The user may intend for a task or action to be performed/completed at some point in the conversation. The task or action can be placing a call, booking an event, sending a message, controlling a device, accessing information, and/or any other action that can be performed by a computing device. When a task is completed as a result of the conversation, the conversation can be stored with a field or slot that includes a parameter indicating that the conversation resulted in an action (e.g., STORE_CONVERSATION=(content="call sally; Would you like to call . . . ;", action="call", complete="1"). When a task is not completed as a result of the conversation, the conversation can be stored with a field or slot that includes a parameter indicating the conversation did not result in a task being completed (e.g., STORE_CONVERSATION=(content="call sally; Would you like to call . . . ;", action="call", complete="0"). The "complete" parameter can indicate whether a task was completed by using a "1" to indicate an action was completed, and "0" to indicate an action was not completed.

In some implementations, the conversation can be stored as complete even when a performed task was not necessarily completed. For example, the user can engage in a few rounds of conversation with the automated assistant in order to get the automated assistant to start a music application for playing music. However, the automated assistant may ultimately determine that a subscription for the music application has expired, and therefore the automated assistant is unable to open the music application. The conversation between the user and the automated assistant can thereafter be stored by the automated assistant as a complete conversation. In this way, subsequent suggestions for conversations to complete will not include the music application conversation as the conversation was ultimately conclusive with respect to the music application, despite the music application not providing music.

In some implementations, conversation suggestions can be ranked and presented at a conversational interface to provide the user with the ability to complete more relevant conversations that did not result in completion of a task. Ranking of incomplete conversations can be performed by a device separate from a client device (e.g., one or more computing systems forming a so-called "cloud" computing environment) with which the user is engaging in order to preserve computational resources of the client device. The suggestions can be presented as selectable elements at a conversational user interface of the client device, along with other selectable elements that can be associated with the conversation suggestion. For example, a previous incomplete conversation can be associated with a food order that the user was attempting to place, but ultimately did not complete because the user did not provide an address for the food to be delivered. Subsequently, while viewing a food website, the user can be presented with a conversation suggestion corresponding to the incomplete food order conversation. If the user selects the conversation suggestion, a rank associated with the incomplete conversation can be increased. However, if the user does not select the conversation suggestion, then the rank associated with the conversation suggestion can be decreased (or in some cases, unaltered). A result of the rank decreasing can be that the conversation suggestion does not appear the next time the user is looking at the food website. In this way, other higher ranked conversation suggestions can be presented to the user in order that the user might be presented with conversation suggestions that the user would be more interested in continuing to the point of completion.

In some implementations, suggestions for completing conversations can be ranked and weighted according to certain computer-based activities of the user. For example, one or more incomplete conversations suggestions related to a hotel booking can be presented to a user that is searching for hotels. The user can select an incomplete conversation suggestion in order to be taken back to where the user left off in a previous conversation with the automated assistant without having to repeat past commands or other statements to the automated assistant. During the previous conversation the user may have provided the number of guests and the dates for the hotel booking but may not have paid for the hotel booking, therefore the conversation was not complete as a hotel was not booked. The hotel conversation can be stored as incomplete and subsequently provided in association with a selectable element when the user is using a search application to find places to vacation.

In some implementations, the conversation suggestions can be provided in a home page of a client device. The home page can provide multiple different suggestions related to various applications on the client device. For example, the home page can provide reminders about events stored in the calendar application of the client device, and provide news article summaries from a news application on the client device. As the user is exploring the home page, the user can be presented with conversation suggestion elements that, when selected by the user, transition the user to a conversational user interface. The conversational user interface can be populated with inputs from the user and responses from the automated assistant during a previous incomplete conversation associated with the conversation suggestion element. In this way, the user does not necessarily have to repeat the previous inputs in order to lead the automated assistant to perform the originally intended action (e.g., booking a hotel, placing a call, performing a function of an application). Other suggestion elements, that are not conversation suggestions, can also be presented at the home page contemporaneously with the conversation suggestion element. The other suggestion elements can be different than suggestions that were provided at the conversational interface during the previous interactions between the user and the automated assistant. This change of suggestion elements can be based on the assumption that the user was not interested in the previously provided suggestion elements if the user did not select those previously presented suggestion elements.

In some implementations, conversation suggestions can presented to the user based on ranking and/or weights that are established based on aggregate interests of other users. For example, a video may be of particular interest to people as a result of the video being presented on a popular website. If the user previously had a conversation with the automated assistant regarding finding and playing the video, but the conversation did not ultimately result in the video being played, the conversation can be stored as incomplete. The stored conversation can then be ranked based on the interest that other people have in the video. For example, the stored conversation can be ranked higher if people have recently been searching for the video, compared to times when people have not been searching for the video. For example, if subsequent to the incomplete conversation, other people watch the video, and thereafter, the user searches for the video, the user can be presented with a conversation suggestion for completing the conversation to watch the video.

In some implementations, a method implemented by one or more processors is set forth. The method can include analyzing content of a human-to-computer dialog session between user and an automated assistant application. The user can engage with the automated assistant application using a first client device of one or more client devices operated by the user. The method can also include determining, based on the analyzing, that the user did not complete a task raised during the human-to-computer dialog session. The method can further include, based on the determining, storing a state of the human-to-computer dialog session in which the task is primed for completion. Additionally, the method can include, after the storing, providing, to one or more of the client devices, data indicative of a selectable element that is selectable to enable the user to complete the task. The data can be generated based on the state. Furthermore, the selectable element can be selectable to invoke the automated assistant application in the state to resume the human-to-computer dialog session, and can be selectable to cause the task to be completed. The task can include dialing a telephone number. The stored state can identify the incomplete task. In some implementations, the method can also include assigning a rank to the stored state, and comparing the rank to other ranks associated with other stored states of human-to-computer dialogs. Providing the selectable element can be based on the comparing. Additionally, assigning the rank can include identifying an activity of the user that indicates a level of interest of the user in completing the task. Resuming the human-to-computer dialog can cause the automated assistant application to provide, as output at one or more of the client devices, at least one previous response of the automated assistant.

Other implementations may include a non-transitory computer readable storage medium storing instructions executable by a processor (e.g., a central processing unit (CPU) or graphics processing unit (GPU)) to perform a method such as one or more of the methods described above and/or elsewhere herein. Yet another implementation may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

FIGS. 1A-1D illustrate diagrams of a client device 108 that can access an automated assistant capable of storing dialog sessions between a user and an automated assistant interface 114 in furtherance of a task to be completed via the automated assistant or client device 108. While client device 108 is depicted as a smart phone or tablet, this is not meant to be limiting. Client devices may take various other forms, such as standalone interactive speakers, wearable technologies (e.g., smart glasses), vehicle-based client devices (e.g., navigation systems, media control systems), so-called smart televisions, and so forth. In various implementations, various aspects of a dialog session (including its state), or any human-to-machine dialog, can be stored such that the interactions between the user and the automated assistant can be resumed at a later time in order that the initially solicited task can be completed.

Figure 1A:
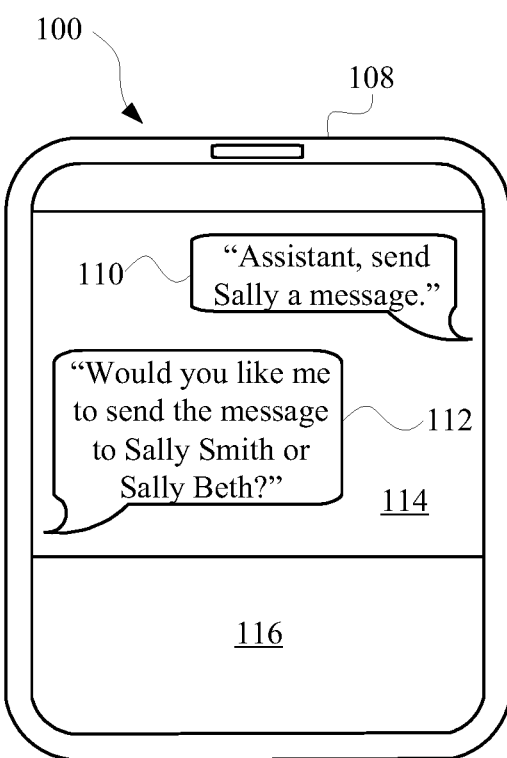
FIGS. 1A, 1B, 1C, and 1D illustrate diagrams of a client device that can access an automated assistant capable of storing dialog sessions between a user and an automated assistant interface in furtherance of a task to be completed via the automated assistant or client device.
Figure 1B:
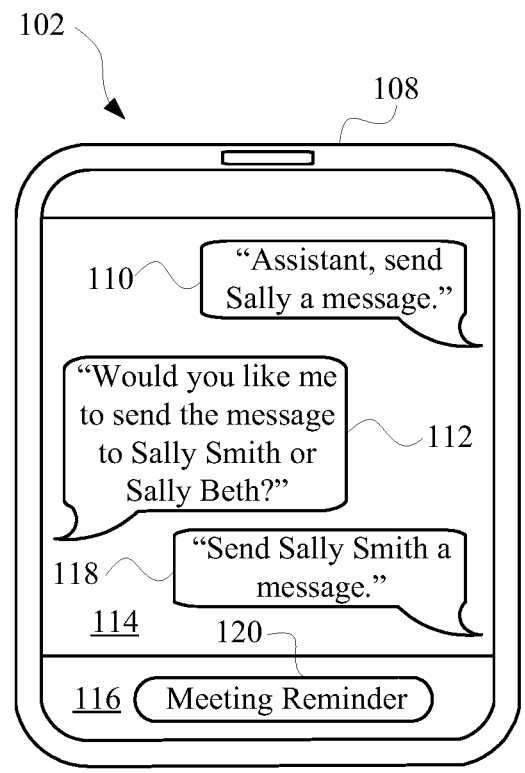
Figure 1C:
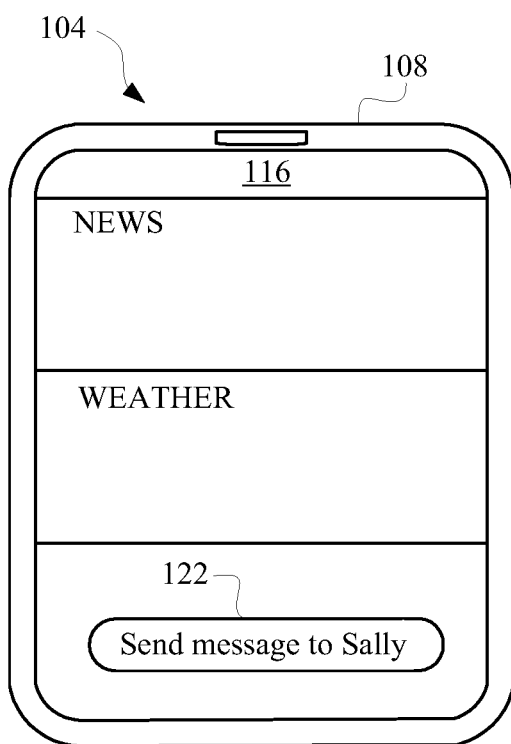
Figure 1D:
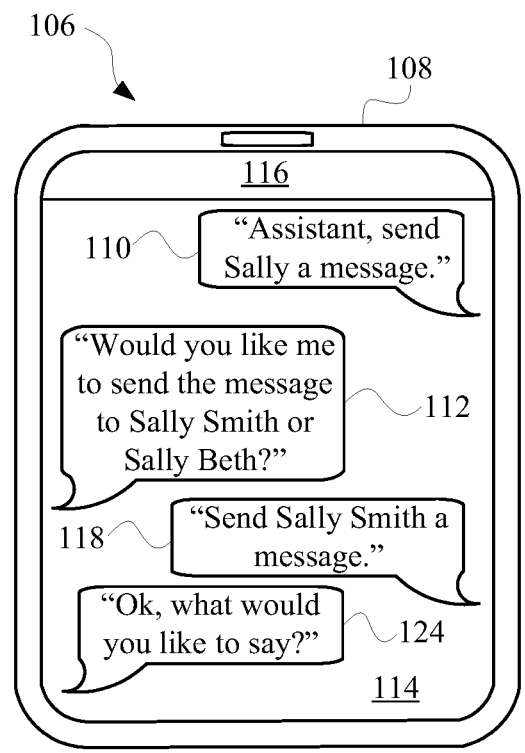

Initially, in some implementations, the user can be viewing a user interface 116 of the client device 108 and solicit the automated assistant, as illustrated in diagram 100 of FIG. 1A. The user can solicit the automated assistant with a first user input 110 such as, for example, "Assistant, send Sally a message." The user can speak the first user input 110 to the client device 108. In some implementations, the client device 108 can record the audio, corresponding to the first user input 110, and transmit the audio to a separate device, such as a remote server, for processing. The remote server, which can host various online components of the automated assistant (e.g., a natural language processor), can process the audio, convert the audio into text, and determine a suitable response to the first user input 110.

In some implementations, the automated assistant can determine that the user has multiple stored contacts with the first name "Sally" (e.g., "Sally Smith" and "Sally Beth") and inquire as to which "Sally" the user is wanting to message. Therefore, in response to the first user input 110, the automated assistant can cause the automated assistant interface 114 to provide a first response 112 that includes the text "Would you like me to send the message to Sally Smith or Sally Beth?" In response, the user can provide a second user input 118 for selecting the exact contact to which the user intends to send the message (e.g., "Assistant, send Sally Smith the message."), as provided in diagram 102 of FIG. 1B. However, while engaging in the conversation with the automated assistant, the user may be distracted and not complete the conversation, at least to the point of the intended action (e.g., sending the message) being performed. For example, while providing the second user input 118 or shortly thereafter, the client device 108 can present a reminder 120 at the user interface 116. The reminder 120 can be regarding a meeting that is happening soon, and therefore the user may be left with no time to finish the dialog session to completion. Regardless, the automated assistant can store the dialog session in order that the user can complete the dialog session to the point of the intended task being completed.

The automated assistant can determine that the dialog session is temporarily incomplete based on actions of the user and/or other indicators associated with the user. For example, if the user does not provide any response to the automated assistant for a threshold period of time, the automated assistant can store the conversation as an incomplete conversation. Alternatively, if the automated assistant becomes aware that the user is operating an application that prevents the user from interacting with the automated assistant (e.g., participating in a video conference), the automated assistant can be put on notice that the conversation is temporarily incomplete. In some implementations, the automated assistant can become aware that the user is operating a separate device from the client device 108 and determine that the user is not available to complete the conversation to the point of the action being performed. For example, the automated assistant can determine that the separate device has moved at least a threshold distance away from the client device 108, thereby putting the automated assistant on notice that the user is away from the client device 108 and the conversation is temporarily incomplete.

In response to the automated assistant determining that the conversation is temporarily incomplete or has otherwise not been completed to the point of an intended task being completed, the automated assistant can store the conversation as a dialog session, e.g., as a "state" of the dialog session. The dialog session can be tagged as incomplete according to the determination that the intended action was not performed at any point during the conversation. For example, the dialog session state can be stored through a command such as "STORE_DIALOG_SESSION_STATE= (content="Assistant, send Sally a message; Would you like me to send . . . ;", action="send message", complete="0"). Alternatively, in some implementations, the dialog session can be stored through a command such as {action=SEND_MESSAGE, content=" . . . ", contact={{"Sally Smith", Work: "838-383-2838", Mobile: "388-238-2338"} {"Sally Beth", "337-382-3823"}}. By storing the dialog session to include the contact names and their respective contact information, sync issues caused by the user modifying contact information (e.g., a telephone number) while the dialog session is interrupted can be eliminated.

The command can be provided from the automated assistant and be executed by the remote server for creating the stored dialog session in memory. The parameter "complete" can correspond to whether the "action" parameter was performed during the conversation. As it pertains to the conversation of FIGS. 1A-1B, the conversation was not completed because the message to Sally was not sent, therefore the "complete" metric is assigned the value "0." Had the message been sent to Sally, the "complete" metric would be assigned the value "1," indicating that the message was sent.

Subsequently, after the meeting, for example, the user can be operating the client device 108 and be viewing the user interface 116. The user can be viewing a summary page or home page of the client device 108, which can include various suggestions of information or applications (e.g., news and weather) to view at the client device 108, as provided in diagram 104 of FIG. 1C. At least one of the suggestions can correspond to a selectable element 122 that is associated with the stored dialog session. For example, the selectable element 122 can include the phrase "Send message to Sally," which can serve as a reminder to the user that they were previously using the automated assistant to send a message to "Sally." The selectable element 122 can operate such that, when the selectable element 122 is selected by the user, the automated assistant interface 114 can be opened at the client device 108, as provided in diagram 106 of FIG. 1D. In response to the user selecting the selectable element 122, the automated assistant can repopulate the automated assistant interface 114 so that the user does not have to repeat their past inputs. Furthermore, any responses from the automated assistant to the last user input in the stored dialog session can also be provided. For example, the second user input 118, which was the last user input in the dialog session, identified the person to whom the message would be sent. In response, after the meeting, the automated assistant can provide a second response 124 such as, for example, "Ok, what would you like the message to say?" In this way, the user will be closer to completing the dialog session than before the meeting, because the automated assistant has provided the second response 124 without having the user repeat their last input.

Figure 2:
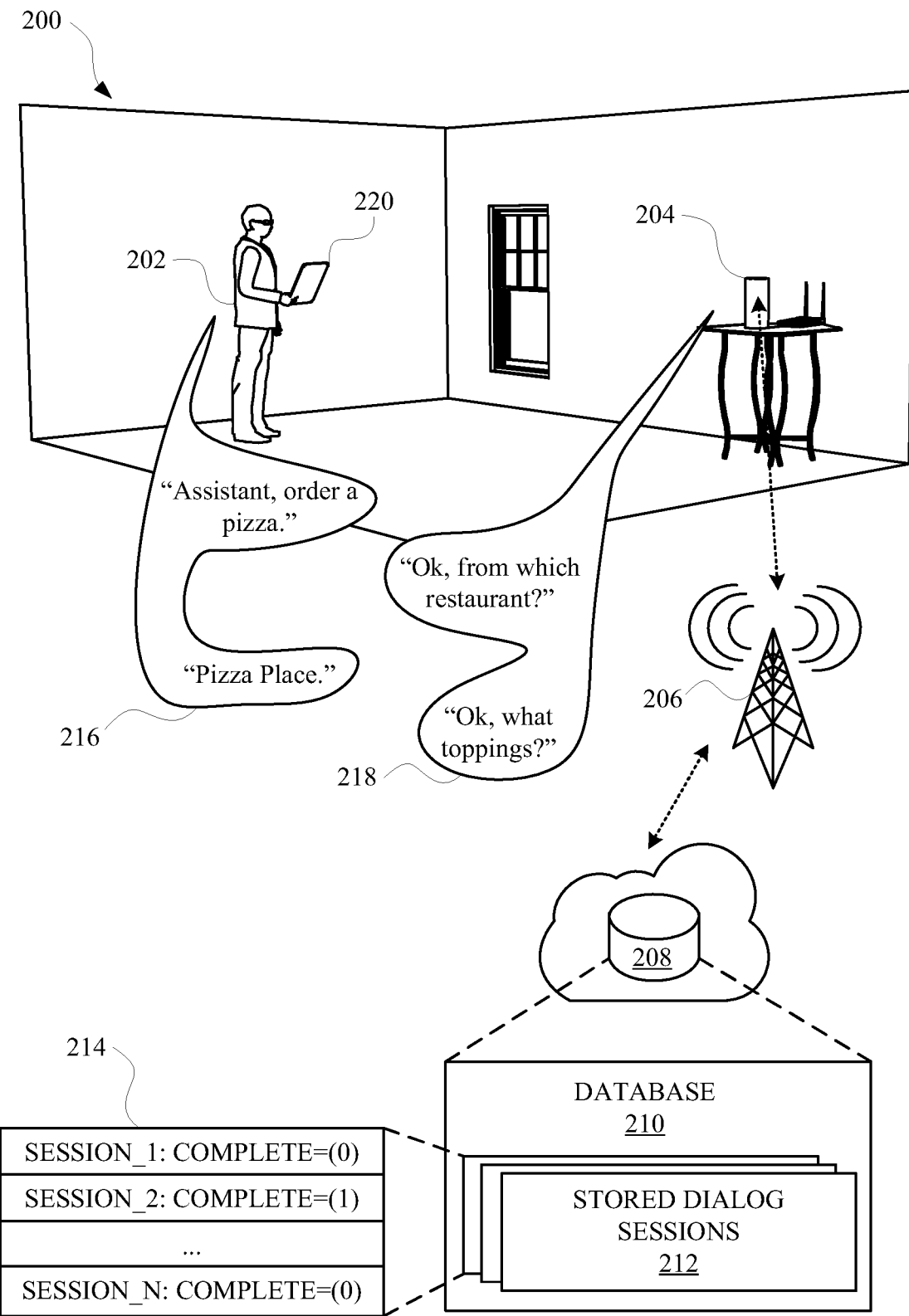
FIG. 2 illustrates a diagram of a dialog session being tagged as incomplete in response to a user not completing the dialog session with an automated assistant.

FIG. 2 illustrates a diagram 200 of a dialog session being tagged as incomplete in response to a user not completing the dialog session with an automated assistant. A user 202 can be participating in a dialog session with an automated assistant via a client device 204 (which in FIG. 2 takes the form of a standalone interactive speaker, but this is not meant to be limiting). The automated assistant can act as an intermediary between the user 202 and a third party agent associated with an application or website. The third party agent can be available to the user 202 for assisting the user 202 with performing a function associated with the application or website. The automated assistant can receive user inputs 216 from the user 202, process the user inputs 216, and provide the processed user inputs 216 to the third party agent. For example, the third party agent can be associated with a pizza ordering application, and the user 202 can initialize a pizza order via the automated assistant with a user input 216 such as "Assistant, order a pizza." The automated assistant can process the user input 216 to determine that the user 202 is intending to engage the third party agent associated with the pizza ordering application. The automated assistant can respond to the user 202 via an automated assistant interface of the client device 204 (e.g., an audio system of the client device 204) with a response output 218 such as "Ok, from which restaurant?" The user 202 can, again, provide a user input 216 in response by identifying the restaurant (e.g., "Pizza Place."), and the automated assistant can, again, provide a response output 218 by requesting more information about the order (e.g., "Ok, what toppings?"). In some cases, the user 202 may become distracted at this time, for example, by a phone call being received at a mobile device 220. The automated assistant can become aware of that the user 202 is temporarily disinterested in completing the dialog session, at least to the point of a task being completed/performed (e.g., placing a pizza order with the third party agent). In response, the automated assistant can store the dialog session as an incomplete dialog session.

The automated assistant can be in communications over one or more networks 206 with a remote device 208, such a server, which can include a database 210 for managing stored dialog session states 212. Each stored dialog session 212 can correspond to an entry 214 that identifies a dialog session (e.g., "SESSION_1") as complete (e.g., "COMPLETE=(1)) or incomplete (e.g., "COMPLETE=(1)). The dialog session corresponding to the user inputs 216 and response outputs 218 can be stored as "SESSION_1: COMPLETE=(0)," the first entry 214 in the stored dialog sessions 212. Because the dialog session did not result in the ordering of a pizza with the third party agent, the entry 214 corresponding to the dialog session can be assigned a value of "0" at the "COMPLETE" parameter.

The automated assistant can monitor the user 202 and/or devices used by the user 202 to determine a suitable time or place in which to remind the user about the incomplete dialog session. For example, in some implementations, the mobile device 220 can communicate over the network 206 with the automated assistant, and the automated assistant can determine when the user 202 is no longer participating in the phone call. In some implementations, the automated assistant can determine that the user 202 is no longer interested in completing the dialog session when the mobile device 220 moves away from the client device 204 a threshold distance and/or for a threshold period of time. In response, the automated assistant can store the dialog session as incomplete in the database 210, and provide a suggestion regarding the dialog session when the user 202 and/or the mobile device 220 becomes more proximate to the client device 204 or becomes within a threshold distance of the client device 204.

The automated assistant can cause the client device 204 or the mobile device 220 to provide the suggestion to the user 202 regarding the incomplete dialog session (e.g., "Would you like to continue ordering the pizza?"). The suggestion regarding the incomplete dialog session can be an audible suggestion output by the client device 204 and/or the mobile device 220, or a selectable element provided at the client device 204 and/or the mobile device 220. Should the user 202 choose to continue the dialog session to completion (e.g., completing the pizza order), the automated assistant can update the entry 214 corresponding to the dialog session state at the database 210. The entry 214 can be updated to indicate that the dialog session was completed by modifying the "COMPLETE" parameter to have a value of "1." In this way, the automated assistant will no longer provide suggestions regarding competing the dialog session. However, contents of the dialog session (e.g., the user inputs 216 and the response outputs 218) can be used by the automated assistant to provide future suggestions regarding other incomplete conversations. For example, a user 202 may typically finish incomplete dialog sessions related to actions such as food orders, but not typically finish incomplete dialog sessions related to phone calls. The automated assistant can track this trend, and similar trends, in order to rank entries 214, so that the user 202 is only presented suggestions for completing dialog sessions that user 202 has historically been interested in completing.

Figure 3:
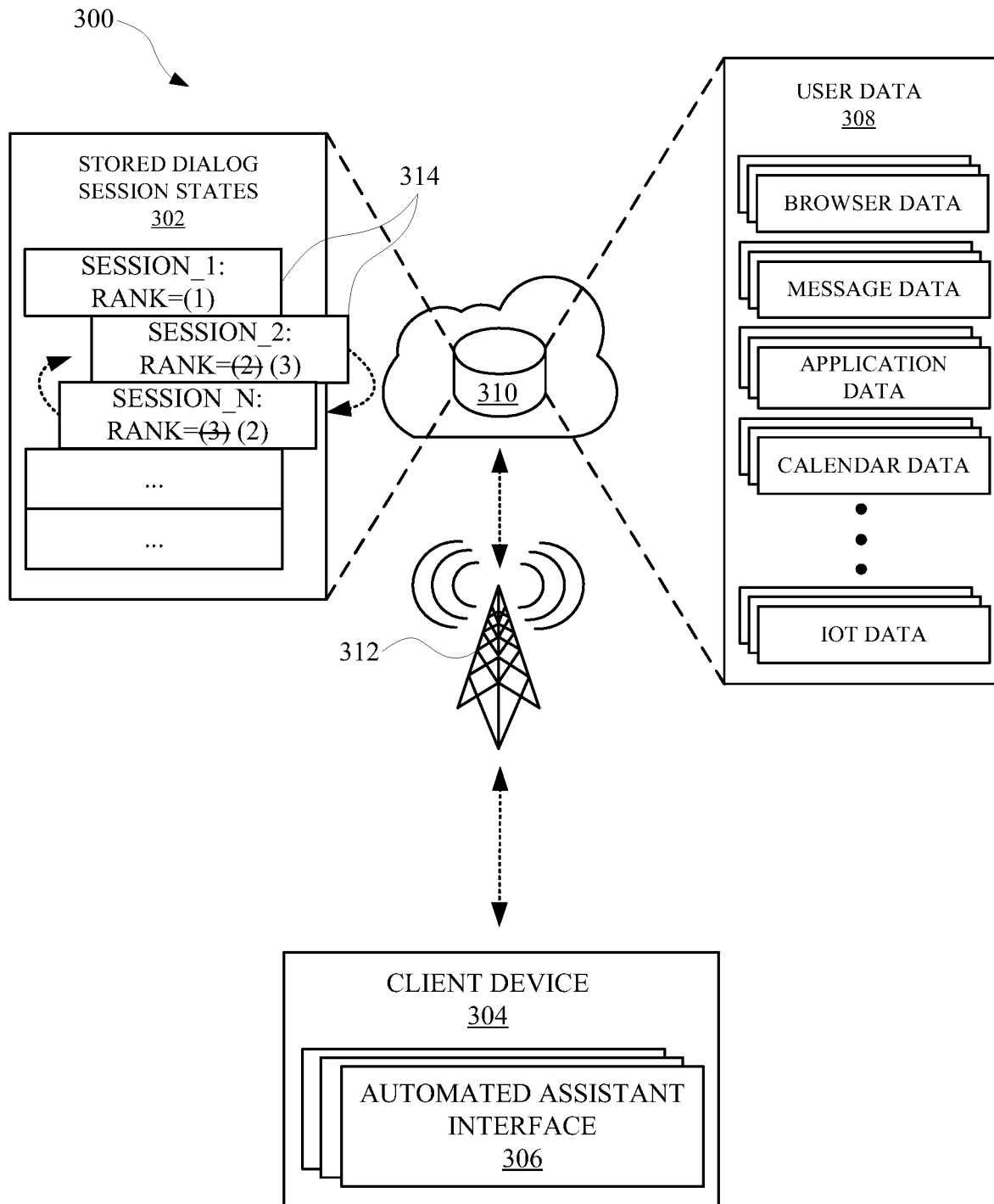
FIG. 3 provides a diagram that illustrates how dialog sessions can be ranked for providing suggestions for presenting at an automated assistant interface of a client device.

FIG. 3 provides a diagram 300 that illustrates how dialog sessions can be ranked for providing suggestions for presentation at an automated assistant interface 306 of a client device 304. In some implementations, automated assistant interface 306 may cooperate (to various degrees) with one or more online automated assistant components, such as a natural language processor, to respond to natural language inputs. The client device 304 can communicate over a network 312 with a remote device 310, such as a server, that can manage stored dialog session states 302 and user data 308. The stored dialog session states 302 can correspond to conversations or human-to-machine interactions between a user and an automated assistant, which can also reside on at the remote device 310. Dialog sessions can be considered by the automated assistant to be incomplete when the interaction between the user and the automated assistant (and a third party agent in some implementations) did not result in a task being completed. The task can be the sending of a message, booking of an event, purchasing of an item, and/or any other task that can be performed by a computing device. The task can be identified in the dialog of the user by the automated assistant and identified in a session entry 314 in the stored dialog sessions 302.

Each session entry 314 can be ranked according to a level of interest that the user has in the dialog session corresponding to the session entry 314. The level of interest can be determined by the automated assistant based on user data 308, which can be associated with the user that participated in the dialog session associated with the stored dialog sessions 302. The level of interest can also be determined using aggregate user data 308 that is associated with other users that have participated in activities related to the action identified in the session entries 314.

In some implementations, a session entry 314 can be stored in response to the user not completing a dialog session related to a hotel booking (e.g., SESSION_2) and also not completing a dialog session related to a making a phone call (e.g., SESSION_N). Each session entry 314 can be initially stored with an assigned rank (e.g., 2 and 3, respectively). However, the automated assistant can analyze the user data 308 to dynamically change the ranks after each corresponding dialog session has been determined to be incomplete. For example, the automated assistant can determine that the user is interested in contacting a person identified in the dialog session associated with the phone call by processing message data. The message data can include emails, text messages, and/or any other messages to other contacts of the user. The automated assistant can also determine that the user is interested in completing the hotel booking by processing browser data, which can show that the user has been searching for a hotel. However, if data related to SESSION_N is identified more frequently than data related to SESSION_2, then the rank for SESSION_N can be modified to be greater than the rank for SESSION_2. This is illustrated in diagram 300, which shows the former rank (3) for SESSION_N being stricken and replaced with a new rank (2), and the former rank (2) for SESSION_1 being stricken and replaced with a new rank (3).

Other portions of the user data 308 can also influence the ranks of the session entries 314. For example, in some implementations, the automated assistant can access application data associated with applications on one or more devices that the user operates at any given time. The automated assistant can use the application data to determine whether the user is performing some function with an application that is related to a stored dialog session 302. In some instances, the user can be operating a social media application that includes application data identifying the contact with which the user was previously attempting to place a call with through the automated assistant. In response to identifying this application data that identifies the contact, the automated assistant can adjust the rank of the session entry 314 corresponding to the incomplete dialog session (e.g., SESSION_N) that was in furtherance of the phone call. In some implementations, the automated assistant can access calendar data and/or internet of things (IOT) device data in order to adjust the ranking of the session entries 314. For example, the calendar data can include a calendar entry that is related the hotel booking identified in a dialog session. As a date corresponding to the calendar entry approaches, the ranking for the session entry 314 associated with the hotel booking (e.g., SESSION_2) can be increased. However, once the date corresponding to the calendar entry passes, the ranking for the session entry 314 can be decreased, as the user is likely no longer interested in an event that has passed. Furthermore, the automated assistant can access IOT data to determine how to adjust a ranking of session entries 314. For example, data from an IOT device, such as a security camera, can be used by the automated assistant to determine that the user is idle in their home. The automated assistant can therefore assume that the user may be interested in continuing a phone call that is identified in a session entry 314 corresponding to an incomplete dialog session. In response to receiving such data from the IOT device, the automated assistant can cause a ranking of the session entry 314 to increase. However, once the user leaves their home, the automated assistant can decrease the ranking, based on the assumption that the user has other plans that might be interrupted by a phone call.

In some implementations, the user data 308 can include data associated with other users. In this way, ranking of session entries 314 and suggestions for completing dialog sessions can be based on the interests of other users. For example, in some instances, the user may initialize a dialog session with the automated assistant to get the automated assistant to find a video. If the dialog session does not result in the playback of the video, the automated assistant can store the dialog session as a session entry 314 associated with a rank. Thereafter, if a number of other users are using a search application to find the video, the automated assistant can use the application data from the search application as a basis for boosting the rank of the session entry 314 associated with the video playback. Thereafter, if the user is performing some function with the client device 304 related to videos, the automated assistant can present the user with a suggestion element for completing the dialog session associated with the previous video search. When the user selects the suggestion element, the client device 304 can present an automated assistant interface 306 that is populated with dialog from dialog session, in order that the user does not have to repeat their inputs in furtherance of the video playback.

Figure 4A:
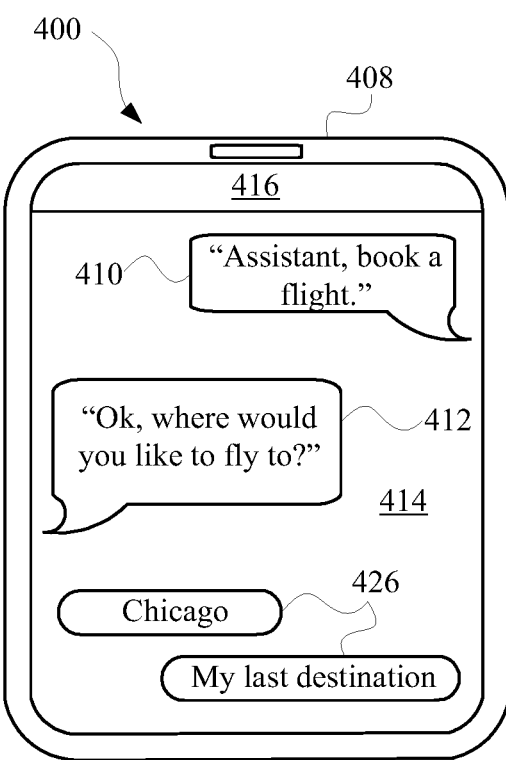
FIGS. 4A, 4B, 4C, and 4D provide diagrams that illustrate how suggestions provided during dialog sessions can be cycled according to an interest of the user in the suggestions.

FIG. 4A-4D provide diagrams that illustrate how suggestions provided at a user interface 416 during dialog sessions can be cycled according to an interest of the user in the suggestions. Specifically, FIG. 4A illustrates a diagram 400 of a client device 408 that can access an automated assistant for helping a user perform certain functions with the client device 408. The user can be interacting with the automated assistant through a conversational interface 414, which can be responsive to textual or spoken inputs from the user. For instance, the user can provide a first input 410 corresponding to a request to book a flight (e.g., "Assistant, book a flight."). The automated assistant can then provide a first response 412 (e.g., "Ok, where would you like to fly to?"). Simultaneously, the automated assistant can provide a first set of suggestions 426 associated with the input from the user. For example, the first set of suggestions 426 can correspond to suggested answers for responding to the first response 412 from the automated assistant. Specifically, the first set of suggestions 426 identify places that the user might be interested in flying to (e.g., "My last destination"). Each suggestion of the first set of suggestions 426 can be assigned a rank that can change depending on whether the user selects the suggestion. For instance, the user can select the suggestion element corresponding to "My last destination" and, in response, the phrase "my last destination" can be considered as a second input 418 from the user to the automated assistant. The rank associated with the suggestion, "My last destination," can also be increased as a result of the user selecting the suggestion. Furthermore, any suggestions associated with the last destination the user traveled to can also be increased, as those suggestions would be helpful in completing the dialog session. The rank associated with the suggestion that the user did not select (e.g., "Chicago") can be decreased, thereby causing the unselected suggestion to potentially not be presented the next time the user is booking a flight via the automated assistant.

Figure 4B:
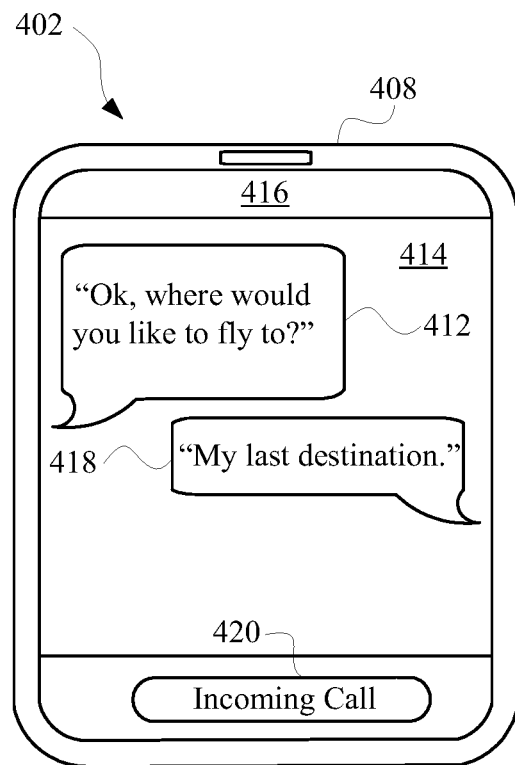
Figure 4C:
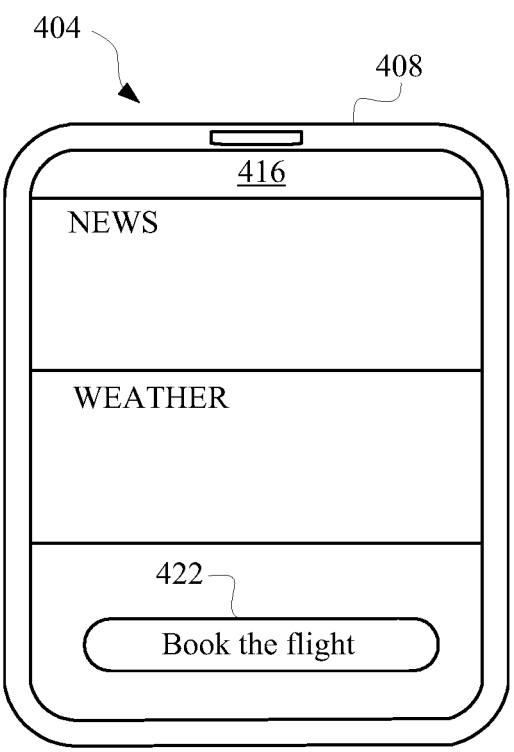

While the dialog session between the user and the automated assistant is occurring, the user can select a call element 420 corresponding to an incoming call, as provided in diagram 402 of FIG. 4B. As a result, the automated assistant can determine that the dialog session is temporarily incomplete and store the dialog session so that the user can later select the dialog session for completion. Sometime after the phone call is complete, the user can be interacting with the client device 408 by viewing a home page of the user interface 416, which can include information from other applications (e.g., news and weather), as provided in diagram 404 of FIG. 4C. At this time, the automated assistant can determine that the user may be interested in completing the flight booking and present a suggestion element 422 at the user interface 416. In response to the user selecting the suggestion element 422, the user interface 416 can transition to the conversational interface 414.

Figure 4D:
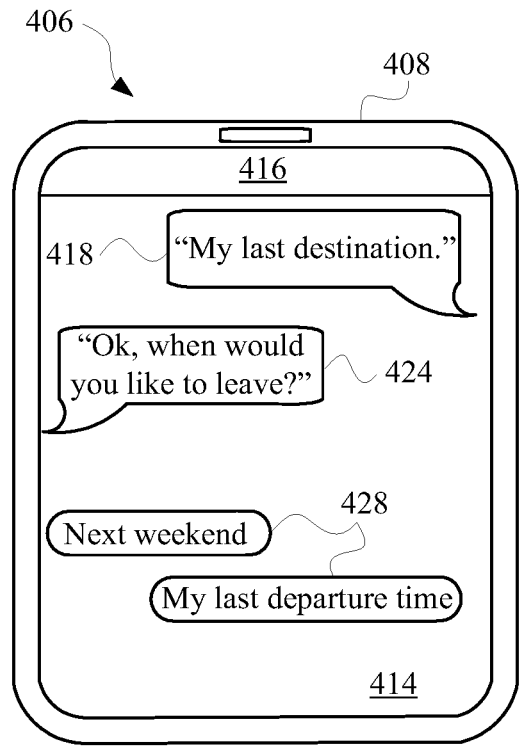

The automated assistant can provide a second set of suggestions 428 at the conversational interface 414, as provided in diagram 406 of FIG. 4D. The second set of suggestions 428 can be generated based on how the user interacted with the first set of suggestions 426. For example, because the user selected to open the stored dialog session by selecting the suggestion element 422, the automated assistant can provide the second input 418 and a second response 424 (e.g., "Ok, when would you like to leave?") at the conversational interface 414. The second set of suggestions 428 can be suggested responses to the second input 418, and be based on the selection and/or non-selection of suggestions from the previous interaction with the automated assistant. For example, because the user expressed interest in the "last destination," any suggestions related to the last destination were increased in rank. As a result, the suggestion, "My last departure time," can be presented by the automated assistant, because the last departure time is associated with the last destination. Ranks can therefore be used to not only rank dialog sessions but also rank suggestions presented during the dialog sessions. In this way, dialog sessions can be streamlined based on user activities in order to preserve computational resources and cause an action to be performed with less steps from the user.

Figure 5:
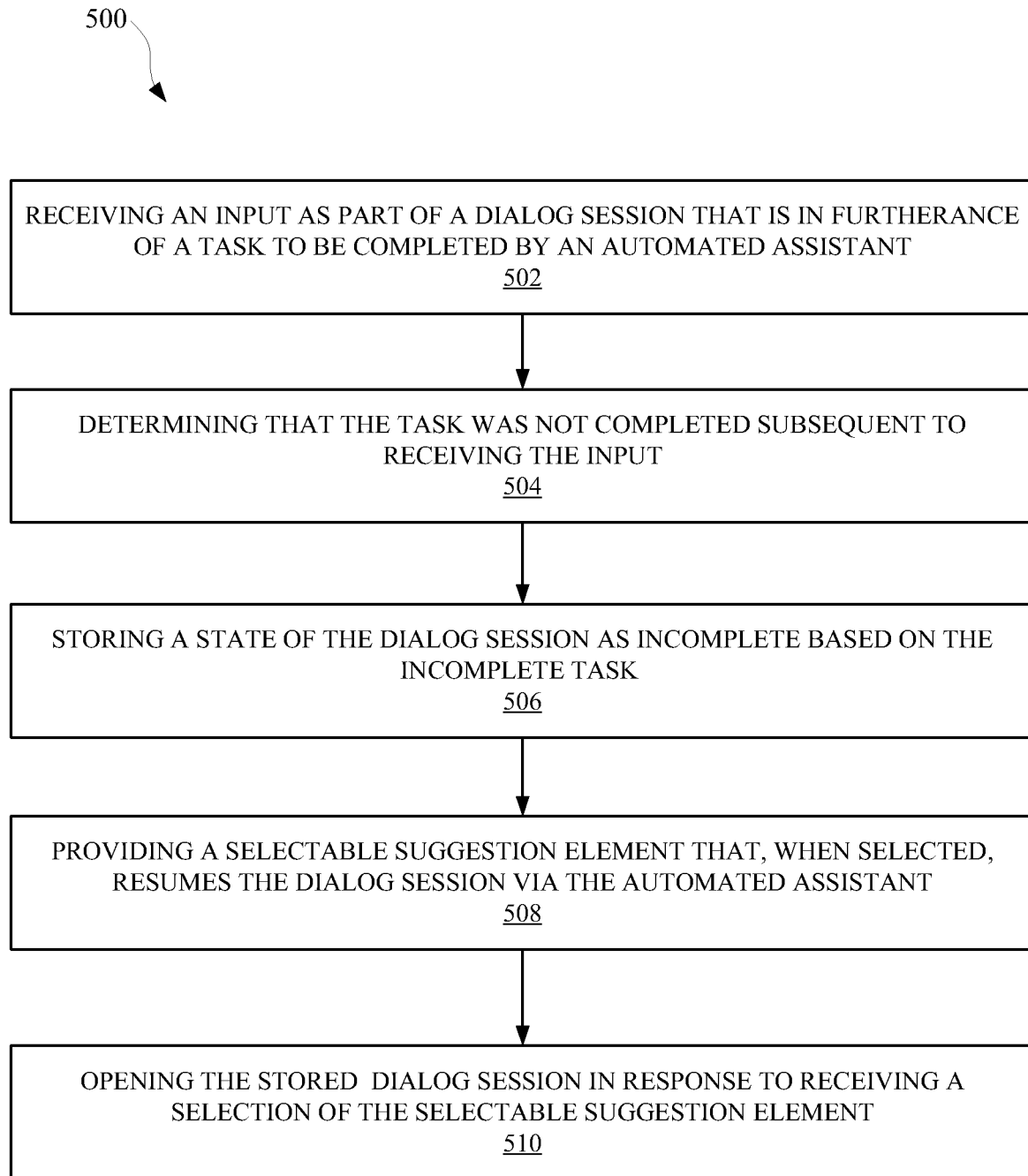
FIG. 5 illustrates a method for resuming a dialog session from a previously stored dialog session that was initialized by a user in furtherance of an action to be performed.

FIG. 5 illustrates a method 500 for resuming a dialog session with an automated assistant from a previously stored dialog session that was initialized by a user in furtherance of an action to be performed. The method 500 can be performed by a client device, server device, mobile device, and/or any other apparatus capable of interacting with a user. The method 500 can include a block 502 of receiving an input as part of a dialog session that is in furtherance of a task to be completed via an automated assistant and/or a third party agent. The input can be a textual input to an automated assistant interface and/or a spoken input from a user to the automated assistant interface. Furthermore, the task can be sending a message, placing a phone call, opening a website, booking an event, and/or any other action that can be performed by a computing device.

The method 500 can further include a block 504 of determining that the action was not completed subsequent to receiving the input. The determination from block 504 can be based on one or more activities of the user during or after the dialog session. For example, the determination can be based on a location of the user, whether the user is viewing a particular application, websites viewed by the user, messages to or from the user, and/or any other information indicative of an activity of the user.

The method 500 can also include a block 506 of storing a state of the dialog session as incomplete based on the incomplete task. In various implementations, the "state" may contain sufficient data such that when the dialog session is resumed in the stored state, the task may be "primed" (e.g., set up, presented, laid out, etc.) for completion. For example, when the dialog session is resumed in the stored state, the user may be taken back to the most recent dialog message (from the user or from the automated assistant) so that the user can pick up where he or she left off to complete the task as quickly as practicable. In some instances, the state of the dialog session can be stored with a slot that can have a discrete value indicating whether a task was ultimately completed by the automated assistant as a result of the dialog session. If the task was completed, the dialog session can be stored as complete, and if the task was not completed, the dialog session can be performed as incomplete.

At block 508, a selectable suggestion element can be provided such that, when the selectable suggestion element is selected, the dialog session can be resumed via the automated assistant in the stored state so that the incomplete task is primed for completion. The selectable suggestion element can be a graphical icon that can be selected by the user to invoke the automated assistant for resuming the previous dialog session. In some implementations, block 508 can be a step of providing an output (e.g., an audible output) from the automated assistant to the user for suggesting that the user complete the dialog session. At block 510, the stored dialog session can be opened in response to receiving a selection of the selectable suggestion element. The dialog session can be opened at an automated assistant interface, and start according to the where the dialog session was considered incomplete. In other words, any inputs from the user and responses from the automated assistant can be incorporated into the opened dialog session in order to avoid the user having to repeat previous inputs.

Figure 6:
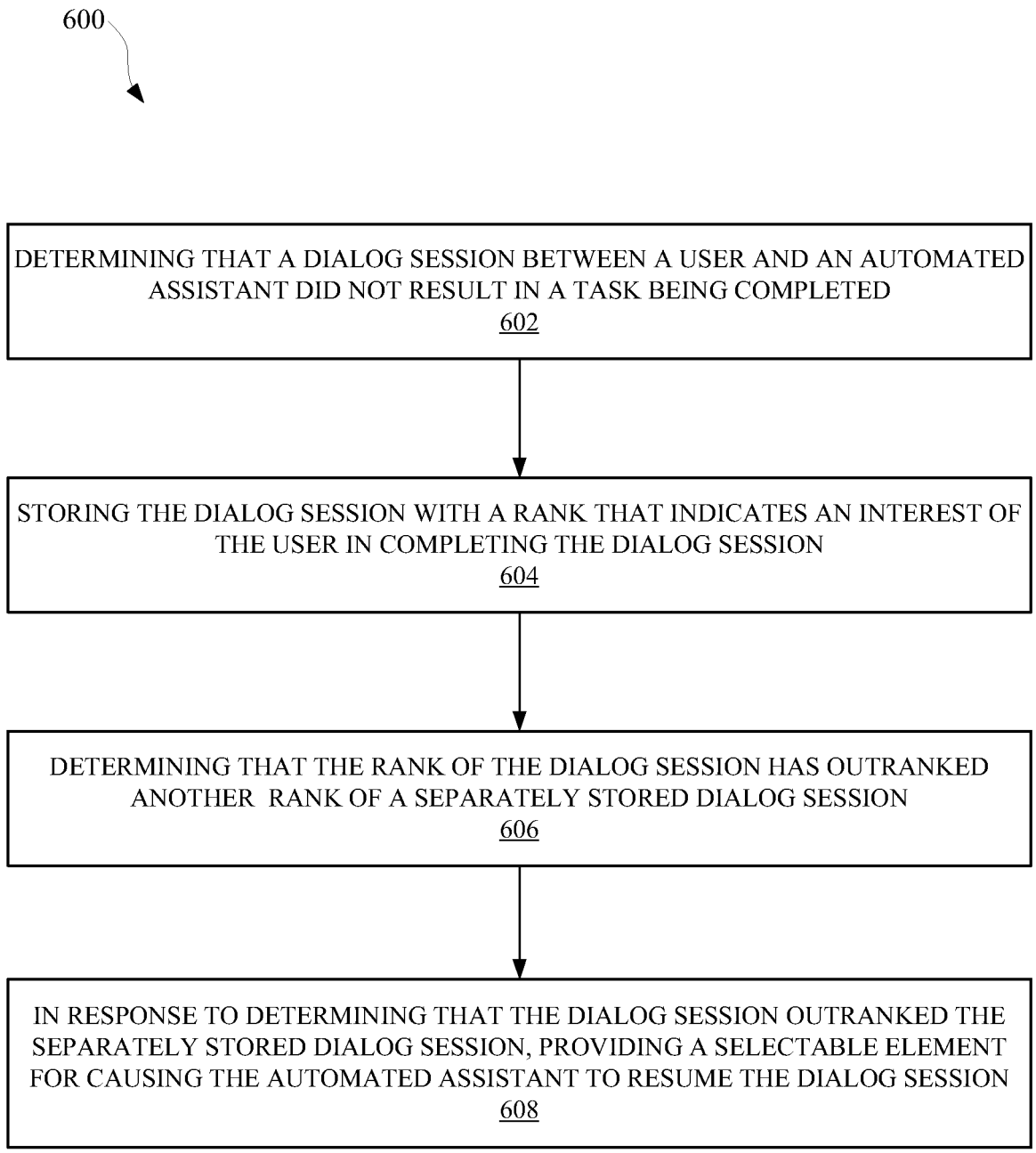
FIG. 6 illustrates a method of providing a selectable element for resuming a dialog session according to ranks of stored dialog sessions.

FIG. 6 illustrates a method 600 of providing a selectable element for resuming a dialog session according to ranks of stored dialog sessions. The method 600 can be performed by a client device, server device, mobile device, and/or any other apparatus capable of interacting with a user. The method 600 can include a block 602 of determining that a dialog session between a user and an automated assistant did not result in a task being completed. The dialog session can include multiple inputs from the user and multiple responses from the automated assistant in response to the user. During the dialog session, the user could have identified a task such as sending a message, which can be identified by the automated assistant as the action to be performed. Therefore, if the task is not ultimately completed during the conversation, the dialog session can be considered incomplete.

At block 604, the dialog session is stored with a rank that indicates an interest of the user in completing the dialog session. The rank can be based on user data that is accessible to the automated assistant. The user data can be based on activities of the user involved in the dialog session and/or any other users that use similar automated assistants. The method 600 can also include a block 606 of determining that the rank of the dialog session has outranked another rank of a separately stored dialog session. For example, the dialog session regarding sending the message can outrank a dialog session regarding purchasing concert tickets. As a result, the user can be shown one or more suggestions regarding completing the dialog session related to sending the message, rather than suggestions related to purchasing concert tickets. At block 608, in response to determining that the dialog session outranked the separated stored dialog session, a selectable element can be provided for causing the automated assistant to resume the dialog session. In other words, when the user selects the selectable element, a conversational user interface can be presented with the inputs and responses from the when the dialog session was considered incomplete. In this way, the user can continue the dialog session in furtherance of the action (e.g., sending the message) without having to repeat any inputs to the automated assistant.

Figure 7:
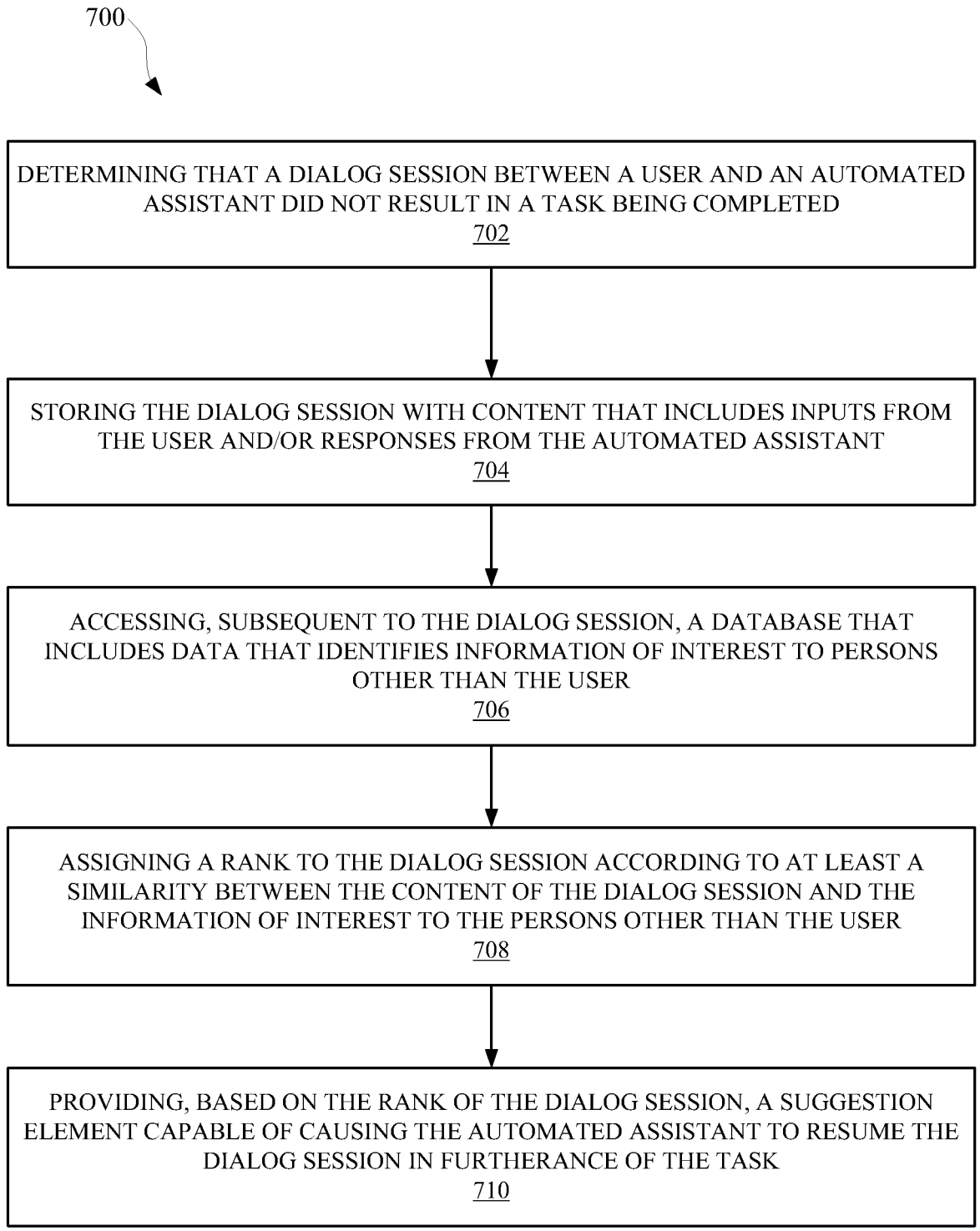
FIG. 7 illustrates a method for providing suggestions to a user for resuming an unfinished dialog session according to user data associated with multiple different users.

FIG. 7 illustrates a method 700 for providing suggestions to a user for resuming an unfinished dialog session according to user data associated with multiple different users. The method 700 can be performed by a client device, server device, mobile device, and/or any other apparatus capable of interacting with a user. The method 700 can include a block 702 of determining that a dialog session between a user and an automated assistant did not result in a task being completed. At block 704, the dialog session can be stored with content that includes inputs from the user and/or responses from the automated assistant during the dialog session. For example, the dialog session can include an input in which the user invoked the automated assistant (e.g., "Assistant, please purchase movie tickets."), as well as responses to the invocation from the automated assistant (e.g., "Ok, what movie would you like to see?").

At block 706, subsequent to the dialog session, a database that includes data that identifies information of interest to persons other than the user can be accessed. The data can correspond to application data from application on devices owned by such persons, as well as any other data that can be indicative of trends that might be of interest to the user. At block 708, a rank can be assigned to the dialog session according to, at least, a similarity between the content of the dialog session and the information of interest to the persons other than the user. For example, the information of interest to the persons other than the user can include searches performed related to a movie that is being released. Similarly, the dialog session content can include a user input invoking the automated assistant for purchasing tickets to the movie. Therefore, the rank of the stored dialog session can reflect the interest of the other persons in the movie. At block 710, based on the rank of the dialog session, a suggestion element can be provided that, when selected, causes the automated assistant to resume the dialog session in furtherance of completing the task (e.g., purchasing a movie ticket).

Figure 8:
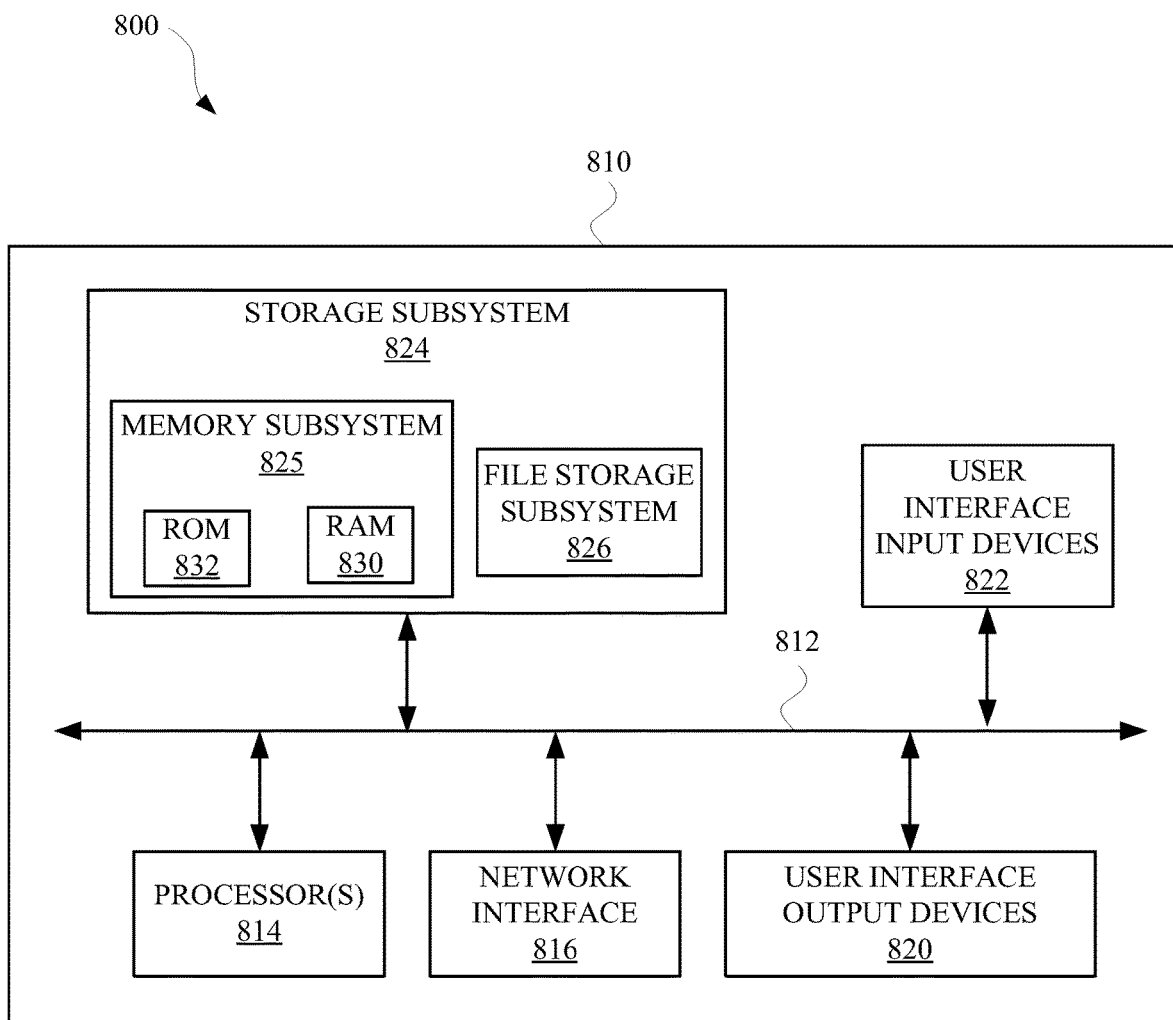
FIG. 8 is a block diagram of an example computer system.

FIG. 8 is a block diagram 800 of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 can include the logic to perform selected aspects of methods 500, 600, 700, and/or to implement one or more of the server devices, client devices, databases, engines, and/or modules described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
processing content of a dialog session between a user and an automated assistant,
wherein the user engages with the automated assistant via an automated assistant interface of a client device of one or more client devices associated with the user,
wherein the automated assistant interface is associated with an automated assistant application of the client device, and
wherein the content of the dialog session between the user and the automated assistant includes at least an invocation phrase directed to the automated assistant and a command phrase directed to the automated assistant;
determining, based on a lack of user input while processing the content of the dialog session, that the dialog session is incomplete,
wherein determining that the dialog session is incomplete based on the lack of user input while processing the content of the dialog session includes determining that the dialog session is incomplete based on the lack of user input for a threshold period of time;
generating, based on determining that the dialog session is incomplete, data that characterizes a state of the dialog session; and
subsequent to generating the data that characterizes the state of the dialog session:
determining that the user is engaged in an activity that is associated with the content of the dialog session,
wherein determining that the user is engaged in the activity that is associated with the content of the dialog session includes determining that a subsequent user interaction, of the user, is related to the command phrase of the dialog session that is incomplete, and
wherein the subsequent user interaction, of the user, that is related to the command phrase of the dialog session that is incomplete is via an additional interface associated with an additional application accessible at the client device or an additional client device, of the one or more client devices associated with the user, that is in addition to the automated assistant application associated with the automated assistant interface and that is associated with the command phrase of the dialog session that is incomplete,
causing, in response to determining that the user is engaged in the activity, at least one client device, of the one or more client devices, to provide a selectable element; and
causing, in response to determining that the user selected the selectable element via a touch selection, the at least one client device to solicit a value for a parameter of a task that is associated with the command phrase of the dialog session that is incomplete.

2. The method of claim 1, wherein the subsequent user interaction includes the user interacting with a graphical user interface as the additional interface associated with the additional application, of the client device or the additional client device, that is presenting natural language content associated with the content of the dialog session via the application that is accessible at the client device or the additional client device.

3. The method of claim 2, wherein determining that the subsequent user interaction is related to the content of the dialog session includes determining that the natural language content presented at the graphical user interface identifies a value for a parameter of a task that was initialized during the dialog session and is furthered when the dialog session between the user and the automated assistant is resumed.

4. The method of claim 1, wherein resuming the dialog session causes the automated assistant to:
provide, as output via the one or more client devices, another response that is different from a previous response provided by the automated assistant before the dialog session was in the state.

5. The method of claim 1, wherein the subsequent user interaction is a touch user interaction via the additional interface associated with the additional application accessible at the client device or the additional client device.

6. The method of claim 1, wherein the subsequent user interaction is via the additional interface associated with the additional application accessible at the additional client device.

7. A non-transitory computer readable storage medium configured to store instructions that, when executed by one or more processors, cause the one or more processors to perform operations that include:
  processing content of a dialog session between a user and an automated assistant,
    wherein the user engages with the automated assistant via an automated assistant interface of a client device of one or more client devices associated with the user,
    wherein the automated assistant interface is associated with an automated assistant application of the client device, and
    wherein the content of the dialog session between the user and the automated assistant includes at least an invocation phrase directed to the automated assistant and a command phrase directed to the automated assistant;
  determining, based on a lack of user input while processing the content of the dialog session, that the dialog session is incomplete,
    wherein determining that the dialog session is incomplete based on the lack of user input while processing the content of the dialog session includes determining that the dialog session is incomplete based on the lack of user input for a threshold period of time;
  generating, based on determining that the dialog session is incomplete, data that characterizes at least a state of the dialog session; and
  subsequent to generating the data that characterizes at least the state of the dialog session:
    determining that the user is engaged in an activity that is associated with the content of the dialog session,
      wherein determining that the user is engaged in the activity that is associated with the content of the dialog session includes determining that a subsequent user interaction, of the user, is related to the command phrase of the dialog session that is incomplete, and
      wherein the subsequent user interaction, of the user, that is related to the command phrase of the dialog session that is incomplete is via an additional interface associated with an additional application accessible at the client device or an additional client device, of the one or more client devices associated with the user, that is in addition to the automated assistant application associated with the automated assistant interface and that is associated with the command phrase of the dialog session that is incomplete,
    causing, in response to determining that the user is engaged in the activity, at least one client device of the one or more client devices to provide a selectable element; and
    causing, in response to determining that the user selected the selectable element via a touch selection, the at least one client device to solicit a value for a parameter of a task that is associated with the command phrase of the dialog session that is incomplete.

8. The non-transitory computer readable storage medium of claim 7, wherein the subsequent user interaction includes the user interacting with a graphical user interface as the additional interface associated with the additional application, of the client device or the additional client device, that is presenting natural language content associated with the content of the dialog session via the application that is accessible at the client device or the additional client device.

9. The non-transitory computer readable storage medium of claim 8, wherein determining that the subsequent user interaction is related to the content of the dialog session includes determining that the natural language content presented at the graphical user interface identifies a value for a parameter of a task that was initialized during the dialog session and is furthered when the dialog session between the user and the automated assistant is resumed.

10. The non-transitory computer readable storage medium of claim 7, wherein resuming the dialog session causes the automated assistant to:
  provide, as output via the one or more client devices, another response that is different from a previous response provided by the automated assistant before the dialog session was in the state.

11. A system, comprising:
  one or more processors; and
  memory storing instructions that, when executed by the one or more processors, cause the one or more processors to perform operations that include:
    processing content of a dialog session between a user and an automated assistant,
      wherein the user engages with the automated assistant via an automated assistant interface of a client device of one or more client devices associated with the user,
      wherein the automated assistant interface is associated with an automated assistant application of the client device, and
      wherein the content of the dialog session between the user and the automated assistant includes at least an invocation phrase directed to the automated assistant and a command phrase directed to the automated assistant;
    determining, based on a lack of user input while processing the content of the dialog session, that the dialog session is incomplete,
      wherein determining that the dialog session is incomplete based on the lack of user input while processing the content of the dialog session includes determining that the dialog session is incomplete based on the lack of user input for a threshold period of time;
    generating, based on determining that the dialog session is incomplete, data that characterizes at least a state of the dialog session; and
    subsequent to generating the data that characterizes at least the state of the dialog session:
      determining that the user is engaged in an activity that is associated with the content of the dialog session,
        wherein determining that the user is engaged in the activity that is associated with the content of the dialog session includes determining that a subsequent user interaction, of the user is related to the command phrase of the dialog session that is incomplete, and
        wherein the subsequent user interaction, of the user, that is related to the command phrase of the dialog session that is incomplete is via an additional interface associated with an additional application accessible at the client device or an additional client device, of the one or more client devices associated with the user, that is in addition to the automated assistant application associated with the automated assistant interface and that is associated with the command phrase of the dialog session that is incomplete, causing, in response to determining that the user is engaged in the activity, at least one client device of the one or more client devices to provide a selectable element; and causing, in response to determining that the user selected the selectable element via a touch selection, the at least one client device to solicit a value for a parameter of a task that is associated with the command phrase of the dialog session that is incomplete.

\* \* \* \* \*